Jan. 22, 1952 A. W. BORSUM ET AL 2,582,957

COMMUNICATION SYSTEM

Filed Nov. 26, 1945 9 Sheets-Sheet 1

Inventor

ADOLPH W. BORSUM
WILHELM W. BROCKWAY

By Ralph L. Chappell

Attorney

Inventor
ADOLPH W. BORSUM
WILHELM W. BROCKWAY
By Ralph L. Chappell
Attorney

Jan. 22, 1952 A. W. BORSUM ET AL 2,582,957

COMMUNICATION SYSTEM

Filed Nov. 26, 1945 9 Sheets-Sheet 3

Inventor

ADOLPH W. BORSUM

WILHELM W. BROCKWAY

By Ralph L. Chappell

Attorney

Inventor
ADOLPH W. BORSUM
WILHELM W. BROCKWAY
By Ralph L. Chappell
Attorney

Inventor
ADOLPH W. BORSUM
WILHELM W. BROCKWAY
By Ralph L. Chappell
Attorney

COMMUNICATION SYSTEM

Filed Nov. 26, 1945 9 Sheets-Sheet 6

Inventor
ADOLPH W. BORSUM
WILHELM W. BROCKWAY
By Ralph L. Chappell
Attorney

Jan. 22, 1952 A. W. BORSUM ET AL 2,582,957

COMMUNICATION SYSTEM

Filed Nov. 26, 1945 9 Sheets-Sheet 7

Inventor

ADOLPH W. BORSUM

WILHELM W. BROCKWAY

By Ralph L. Chappell

Attorney

Jan. 22, 1952 A. W. BORSUM ET AL 2,582,957

COMMUNICATION SYSTEM

Filed Nov. 26, 1945 9 Sheets-Sheet 8

Inventor

ADOLPH W. BORSUM

WILHELM W. BROCKWAY

By Ralph L. Chappell

Attorney

Inventor
ADOLPH W. BORSUM
WILHELM W. BROCKWAY
By Ralph L. Chappell
Attorney

Patented Jan. 22, 1952 2,582,957

UNITED STATES PATENT OFFICE 2,582,957

COMMUNICATION SYSTEM

Adolph W. Borsum, United States Navy, and Wilhelm W. Brockway, Los Angeles, Calif.

Application November 26, 1945, Serial No. 630,957

2 Claims. (Cl. 177—337)

(Granted under the act of March 3, 1883, as amended April 30, 1928; 370 O. G. 757)

Our invention relates to systems for transmission of signals convertible for example into messages, indication of course, range, or the like.

In accordance with our invention, the signal transmitted is in form of a complex wave comprising a reference frequency and one or more other components occurring at rate having fixed numerical relation to said frequency and whose timing within the reference cycle is varied in accordance with information to be conveyed. At the receiving station, the complex wave is separated into its components which are impressed upon a phase meter, or equivalent, for translation of the received wave into the original information.

More particularly, in accordance with one form of our invention, the complex wave comprises a reference frequency and one or more other frequencies bearing a harmonic or sub-harmonic relation with respect thereto whereas in another form of our invention, the complex wave comprises a reference frequency and a pulse whose repetition rate bears fixed numerical relation to the reference frequency.

Our invention resides in the method and systems hereinafter described and claimed. The transmitter per se is claimed in divisional application Number 145,514, filed February 21, 1950.

For an understanding of our invention and illustration of various forms thereof, reference is made to the accompanying drawings in which.

Figure 6:
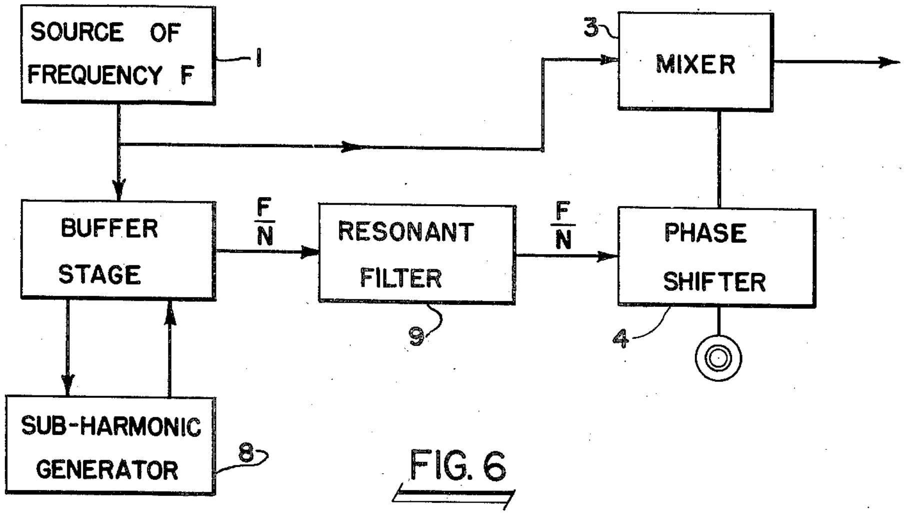
Figure 6 is a block diagram of a modification of the transmitter of Figure 1.
Figure 7:
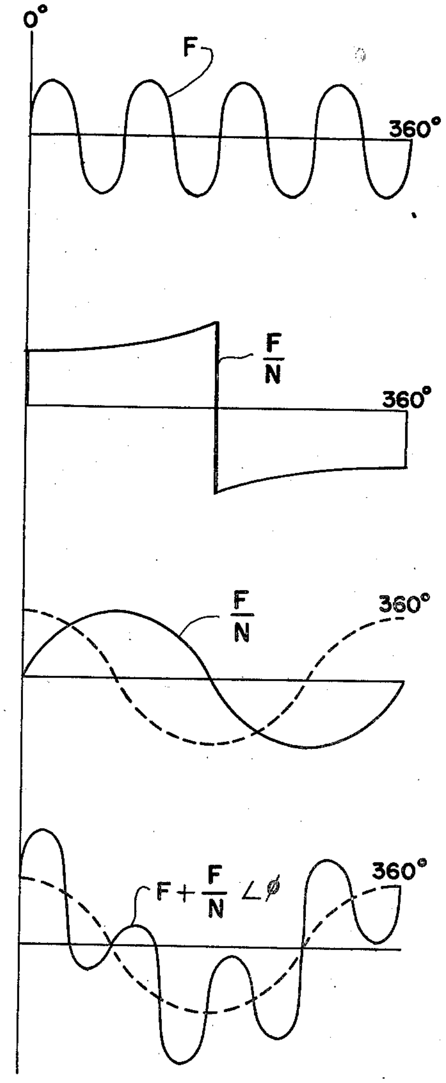

Figure 7 discloses curves referred to in explanation of Figure 6.

Figure 1:
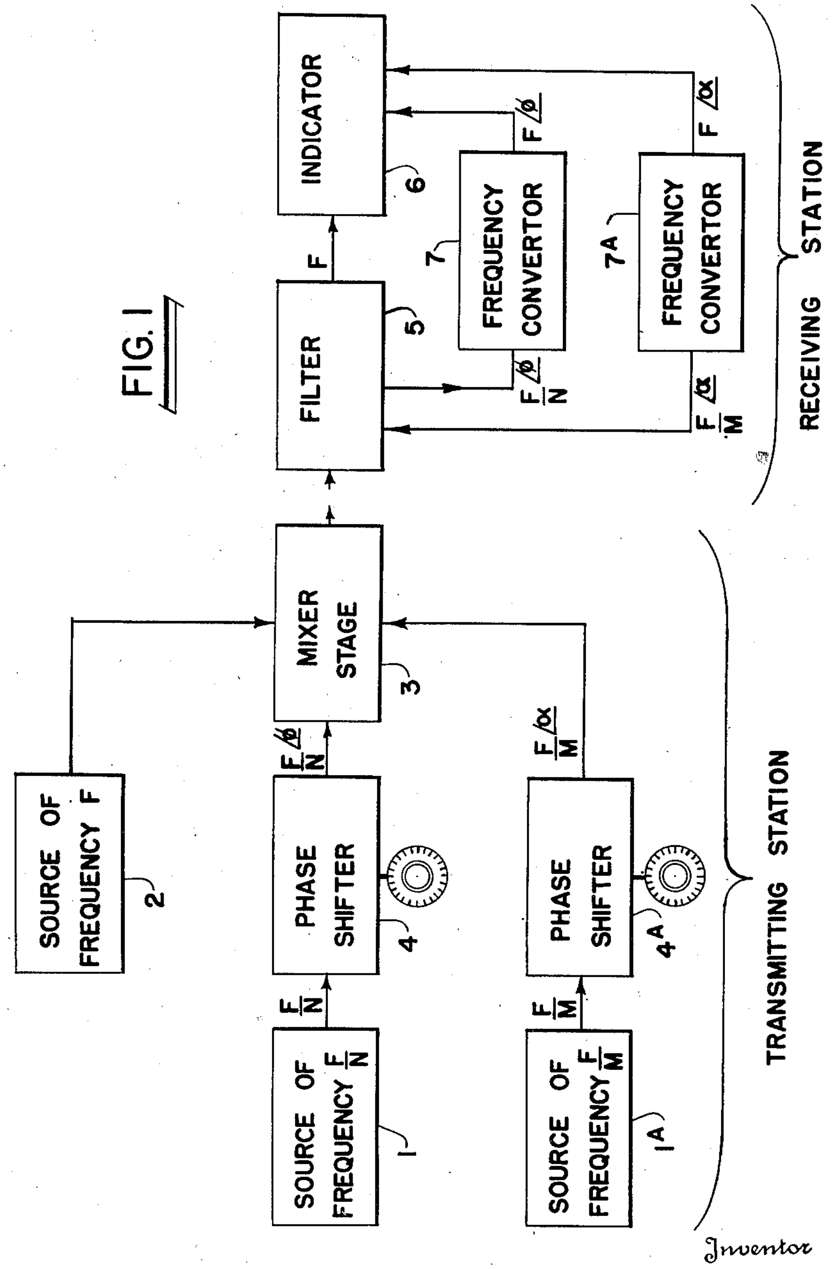
Figure 1 is a block diagram of a communication system.
Figure 8:
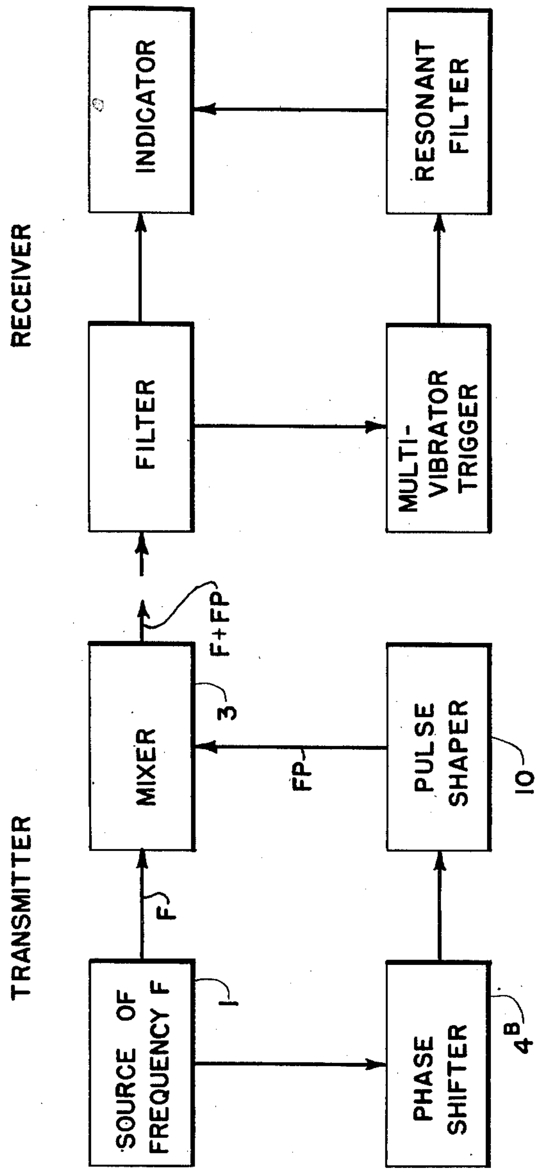

Figure 8 is a block diagram of another modification of the transmitter of Figure 1.

Figure 9:
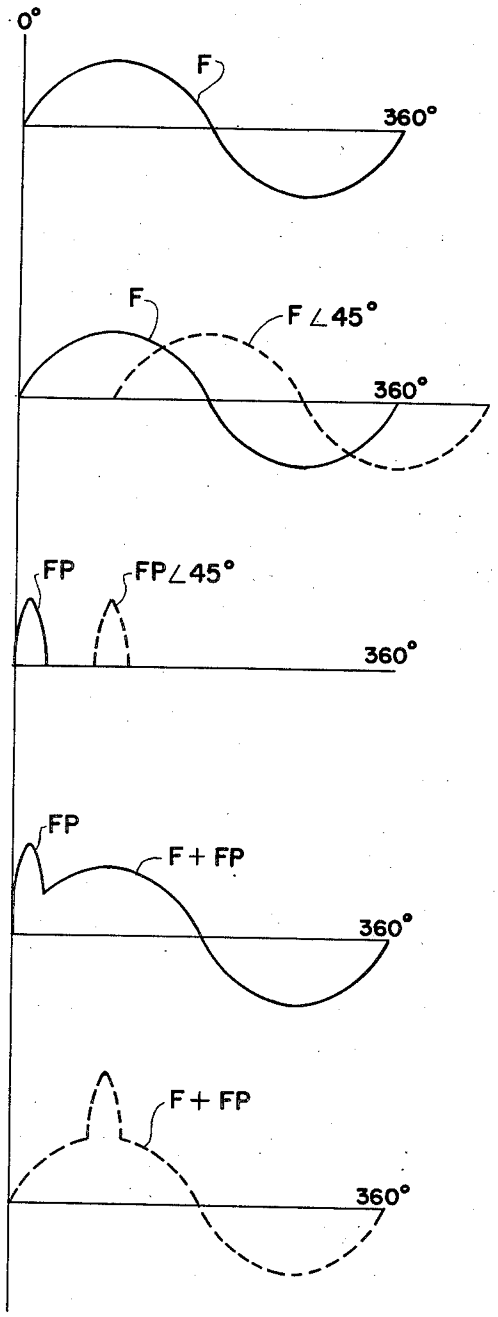

Figure 9 discloses curves referred to in explanation of Figure 8.

Figure 10:
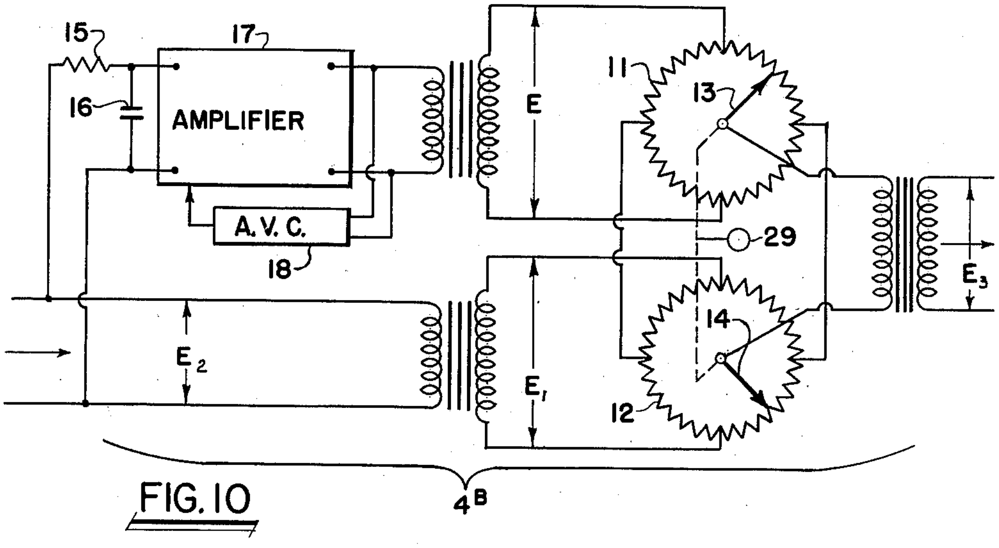

Figure 10 is a schematic diagram showing components of the wave shifter of Figure 8.

Figure 11:
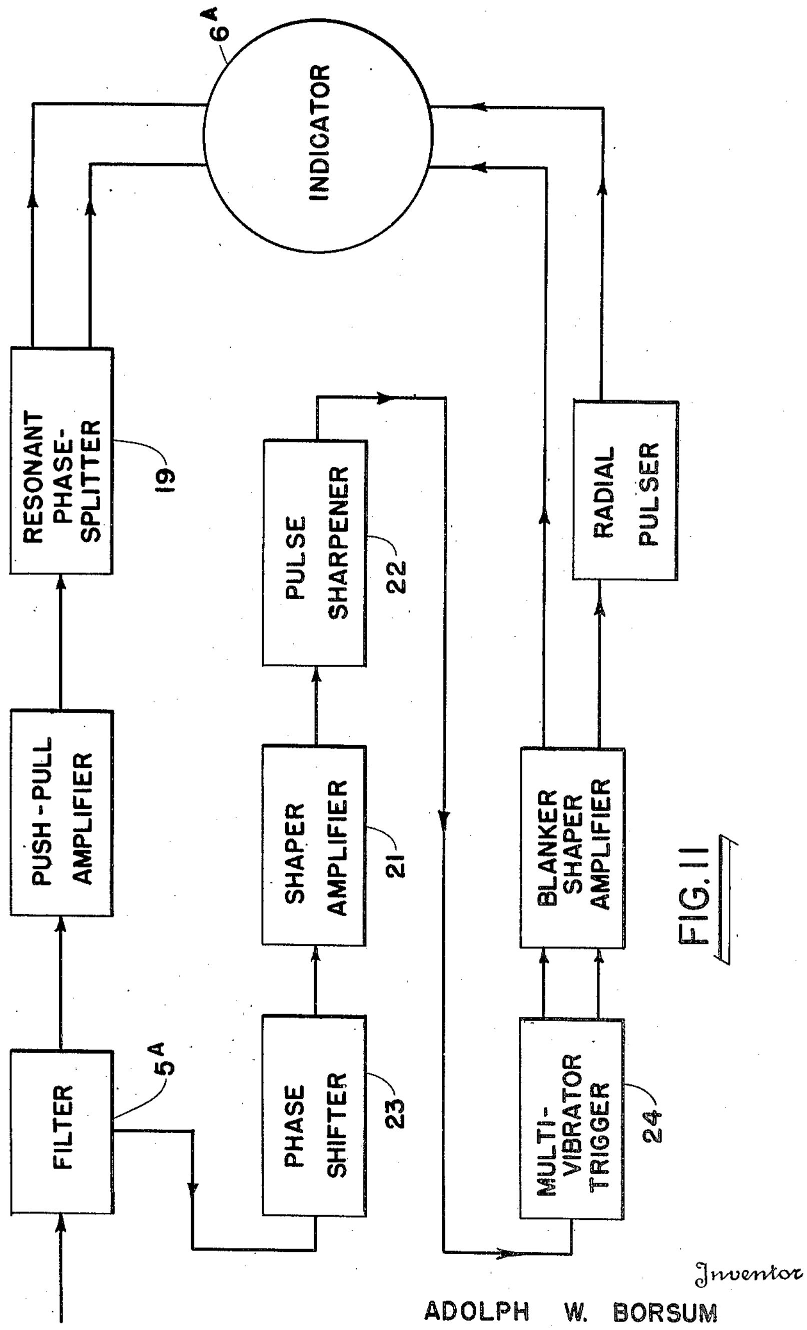

Figure 11 is a block diagram of a modification of the receiver of Figure 1.

Figure 12:
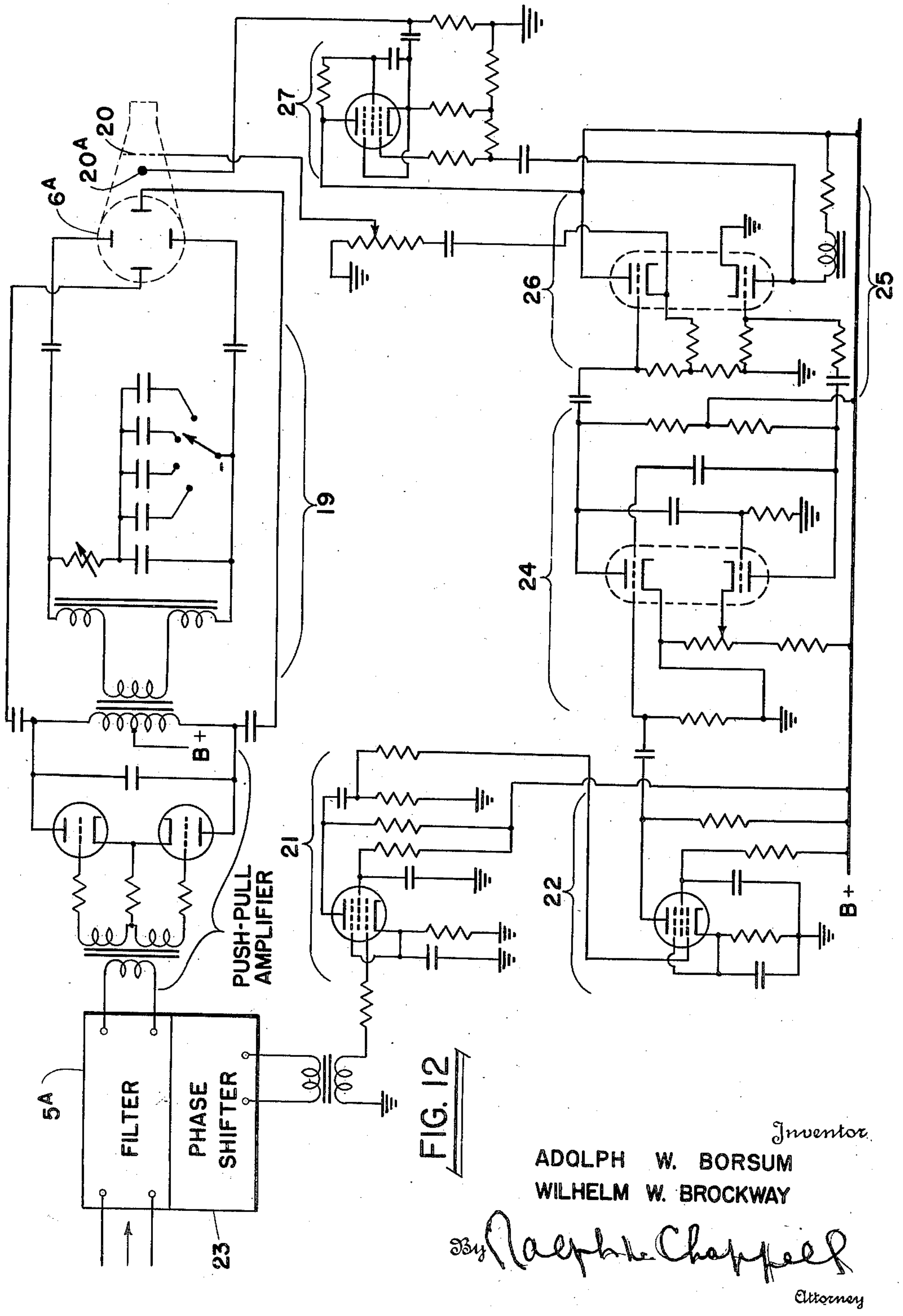

Figure 12 is a wiring diagram of components of Figure 11.

Figure 13:
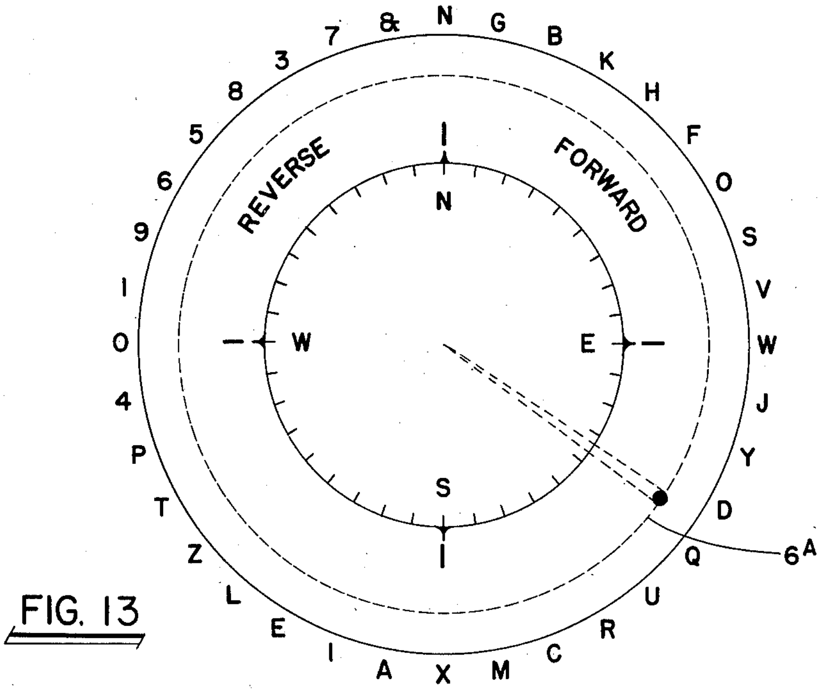

Figure 13 discloses an indicator usable in the receivers of Figures 1, 8 and 11.

Figure 14:
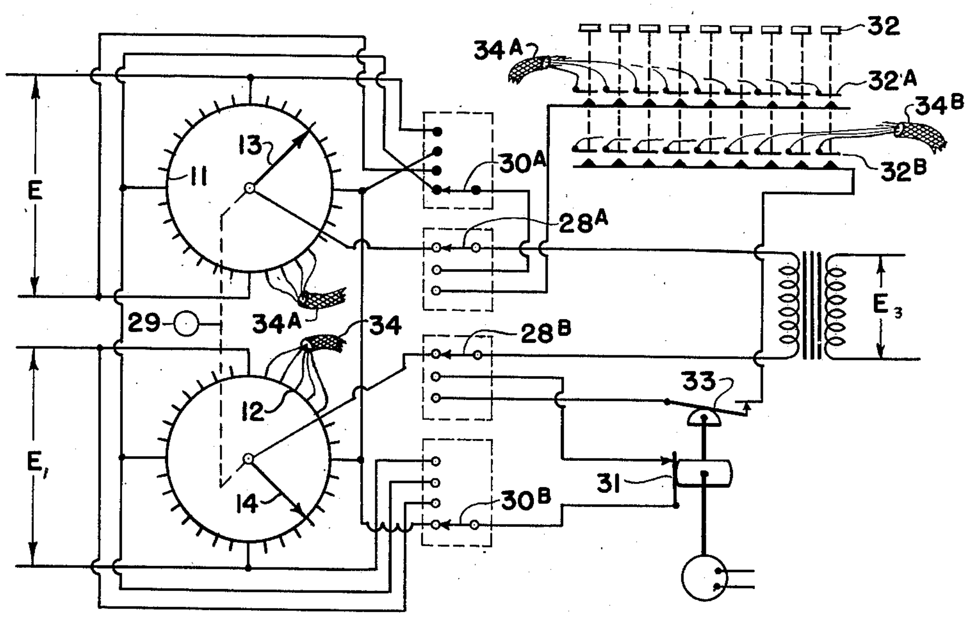

Figure 14 illustrates a modification of Figure 10.

Figure 15:
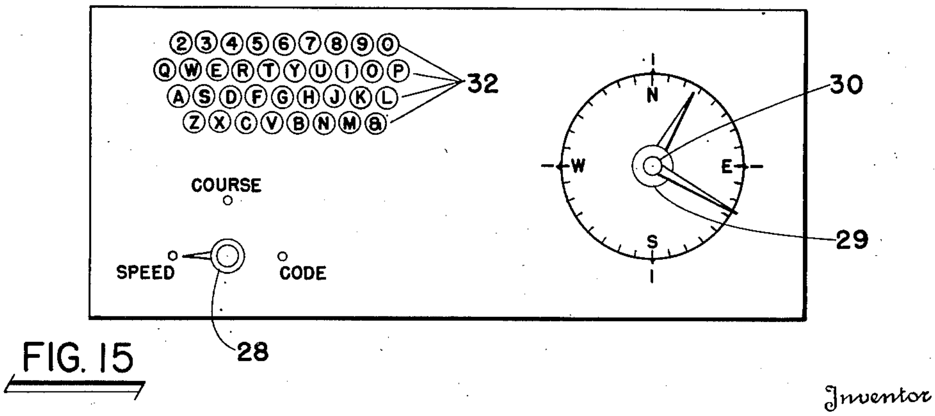

Figure 15 discloses a control board for the phase-shifter shown in Figure 14.

Referring to Figure 1 for explanation of basic principles of our invention, the outputs of the sources 1 and 2 of different frequencies having harmonic or sub-harmonic relation to each other and a fixed time relation are impressed on the mixer stage 3 to produce a complex wave having both frequencies as components. One of the frequencies, for example that of source 2, is used as a reference and between the other source and the mixer 3 is interposed phase-shifter 4 having an adjustable member positioned in accordance with the particular information to be transmitted.

Figure 3:
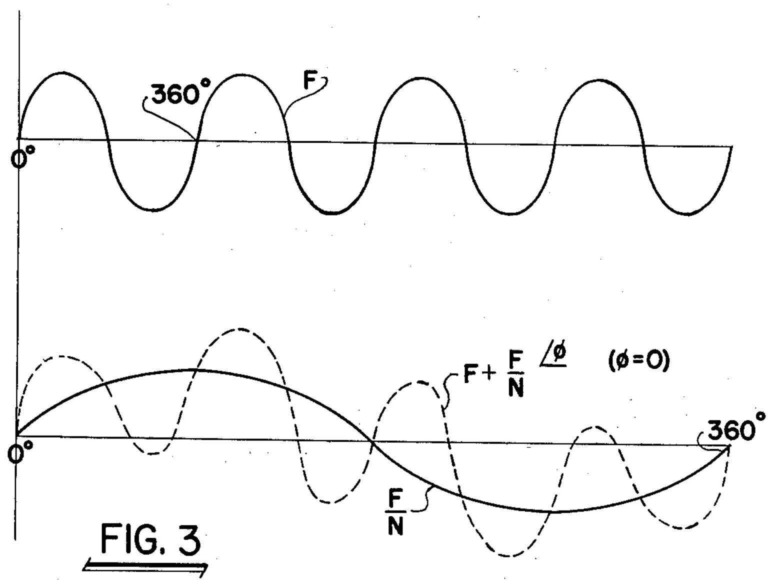
Figures 2 and 3 are curves referred to in explanation of the system shown in Figure 1.
Figure 2:
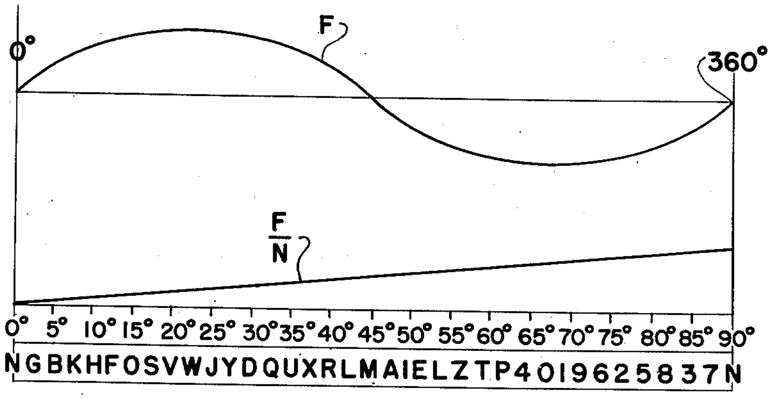

Assuming for purpose of explanation that the frequency F of source 2 is four times that of source 1, and that for zero setting of phase-shifter 4 the time relation of the two waves is as shown in Figures 2 and 3, the output wave of the mixer is of the shape generally shown by the dotted line curve of Figure 3. For this numerical relation of the two frequencies, as the phase-shifter 4 is adjusted to effect from zero to ninety degree shift of phase of frequency F/N the shape of the output wave of the mixer assumes different forms each uniquely corresponding with an adjustment of the phase shifter.

As shown in Figure 2 each successive five degree change in adjustment of the phase-shifter may correspond with a different letter or number or each one degree change may correspond with a four degree change in azimuth. Obviously, if the ratio of the frequencies were two instead of four, the phase shifter 4 should be capable of affording phase-shift of frequency F/N within the range of 0° to 180° to afford the relation shown by Figure 2. From these two examples, the required range of phase-shifter 4 for any other numerical relation of frequencies F and F/N can readily be determined.

Figure 5:
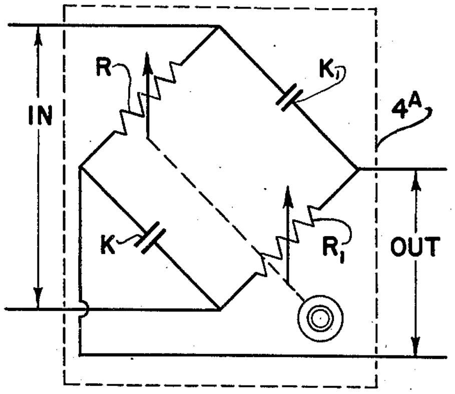
Figures 4 and 5 illustrate phase-shifting networks.
Figure 4:
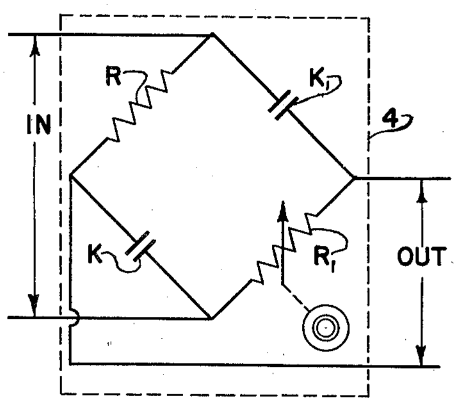

The phase-shifter may be one of any of the suitable known types including those utilizing electromagnetic or electro-static coupling, a resistance-reactance bridge or electronic phase-shift networks. For simplicity a resistance capacity bridge such as shown in Figures 4 and 5 is preferred. The condensers K, K1 are each of ohmic reactance equal, at the impressed operating frequency, to the resistance of resistors R, R1. When, as in first example above described, a 0° to 90° phase shift is desired, only one of the resistors is variable whereas both are adjustable, in unison, when 0° to 180° phase shift is desired. These networks have the advantage that the output amplitude remains constant for the different phase settings.

For transmission to a remote point, the output of mixer 3 of Figure 1, or of any of the modifications hereinafter described, may be utilized to modulate a radio transmitter or it may be impressed on a transmission line directly or as the signal component of a carrier wave. In any event when a carrier is utilized, the carrier frequency should be high compared to both frequencies F and F/N to avoid relative phase shift of the latter during propagation along the path between the transmitting and receiving stations.

At the receiving station, the complex wave is separated by filter 5 into its components. The reference frequency is impressed upon a suitable phase indicator 6: the other component F/N is first impressed on the frequency-convertor 7 for conversion to the same frequency as the reference component and then at reference frequency upon the phase-meter or indicator 6.

If for example, in the transmitter as above specifically described, the phase of frequency F/N is shifted 45° by phase-shifter 4, the output of convertor 7 is 180° out of phase with respect to the output of filter F and accordingly the movable element of phase-meter 6 moves to position corresponding with the letter M setting of phase shifter 4.

Another channel for transmission of intelligence may be provided by addition of another source of frequency F/M having fixed time relation to frequency F and with respect thereto an integral multiple relation different from that of frequency F/N. By way of illustration, the frequency of source 1A may be one-half the frequency of source 2 and twice that of source 1 in which event the phase-shifter 4*a* should be of type, Figure 5 for example, suited to afford a phase-shift of 0° to 180°.

To receive this intelligence at the same or different receiving station, there is then provided a filter of known type suited to separate the two or more components of the complex wave emitted by the transmitter. The reference frequency component and the output of the frequency converter 7A, a doubler in this specific case, are impressed on a phase-meter such as 6. The outputs of the two or more convertor are fed to a common phase-meter of the cathode-ray type and may be concurrently observed provided the signals from the different channels have some characteristic, other than phase displacement, to distinguish them: by way of example, as later described, different rates of interruption may serve to distinguish.

Because of practical difficulties in maintenance of fixed time relation between two or more independent sources of frequency, it is desirable that all frequencies be derived from a single source. As indicated in Figure 6, the source 1 may be utilized to control the frequency of a multi-vibrator or sub-harmonic generator 8 whose square-wave output, Figure 7, is smoothed to sine-wave shape by resonant filter 9 disposed in advance of phase-shifter 4. Preferably, a buffer stage is interposed between the oscillator comprised in source 1 and the multi-vibrator to avoid interaction affecting frequency stability. For multi-channel operation, additional multi-vibrators locking in at different sub-harmonics of the oscillator are used and with each, in advance of its associated phase-shifter, is associated a suitable filter ensuring sine-wave form of the corresponding output sub-harmonic frequency.

In the modification shown in Figure 8, the complex wave output (F+FP) of mixer 3 comprises a reference frequency F and a pulse FP having the same repetition frequency as the reference frequency or a harmonic or sub-harmonic thereof and whose phase or timing with respect to the reference wave is varied in accordance with intelligence to be transmitted.

The reference frequency is impressed on phase-shifter 4B which preferably is of type affording a range from 0° to 360° such as shown in Figure 10 and later herein briefly discussed. The output of the phase shifter is impressed on pulse shaper 10 to produce pulse FP applied to the input system of the mixer 3. Accordingly the point in the complex wave at which the spike or pulse appears is dependent upon the adjustment of the phase shifter.

The pulse shaper 10 may utilize any of the known arrangements suited for that purpose; for example, it may include a "flip-flop" trigger circuit followed by a rectifier which passes only pulses of one polarity and a pulse sharpening circuit having constants selected to obtain suitable narrowness of the spike FP.

The preferred type of phase-shifter, Figures 10, 14, comprises two slide wires 11 and 12 each tapped at four points displaced 90°. The voltage E, impressed on slidewire 11 at two taps which are 180 electrical degrees apart, is 90° out of phase with respect to the voltage E1 impressed on slidewire 12 at two taps which are 180 electrical degrees apart. The other taps of the slidewires are interconnected as shown and their movable contacts 13, 14 are displaced 90° and movable in unison with the result the phase relation of voltages E2 and E3 may be varied throughout the range of 0° to 180°. The movable contacts may engage the successive turns of the resistors 11, 12 to afford a substantially gradual change in phase shift as when it is desired to transmit bearing information or each may engage a series of fixed contacts connected to points angularly displaced along the associated resistor to effect step-by-step phase adjustment as when it is desired to transmit letters, numerals, units of distance or height, speeds and the like.

To obtain a voltage E which is displaced in phase 90° from voltage E1, there is preferably provided, Figure 10, a phase-splitting network, comprising resistor 15 and associated condenser 16 of much lower ohmic value than resistor 15 at the impressed frequency F and an amplifier 17. The amplifier makes up for loss of voltage due to the low drop across condenser 16 and is so designed or adjusted that voltages E and E1 are of equal magnitude. An automatic volume control arrangement 18 maintains this equality for change in frequency of voltage E2 should that occur.

In Figures 11 and 12 is shown a system suited for cathode-ray tube presentation of the multi-frequency complex wave output of the type transmitters shown in Figures 1 and 8 and of pulse-modulated output of the type transmitter shown in Figure 8.

In brief, the reference frequency of the signal is passed to the phase-splitter 19 to provide two voltages in phase quadrature which are applied to the horizontal and vertical deflection plates of cathode-ray tube 6A so to effect rotation of the cathode ray spot which is made visible or intensified under control of the grid 20 whose potential is suddenly changed in response to the other component of the signal wave. In addition, if desired, the spot may be deflected radially by controlling the potential of the central electrode 20A concurrently with that of grid 20. Thus, as shown in Figure 13, for each position of the phase-setter of any of transmitters previously described, there is produced a correspondingly angularly positioned spot or radial trace indicative of certain intelligence, such as a bearing, speed, letter or a number.

Inasmuch as the individual elements of the system of Figure 11 are per se well known and as circuit constants depend upon the tubes and frequencies shown, the circuit diagram, Figure 12, need not be discussed in detail. When only the pulse-type complex wave is to be received, the wave shaper 21 and pulse sharpener 22 may be omitted or replaced by an amplifier.

The phase shifter 23 is provided to compensate for any undesired phase-shift introduced by circuit components of the receiving system or during propagation of the signal. Once set to effect compensation it need usually be adjusted only infrequently if at all. The cathode follower stages 26 and 27 afford coupling of the multi-vibrator 24 to the control electrode 20 and 20a of the cathode-ray tube and the circuit-constants of the radial pulser are chosen to afford a suitably narrow width, for example 1°, of the radial trace.

On or adjacent the face of indicator tube, Figure 13, there are three scales or dials, one for affording indication of bearing, a second for indicating speed and the third for indicating letters or numbers. At the associated transmitter, there is included in the output system of the phase-shifter 4B a keying arrangement for imparting identifying characteristics to signals corresponding with the different types of information. For example, when the switches 28A, 28B operable by a common control knob 28, Figure 15, are in the full line position shown in Figure 14, the slide-wire contacts 13, 14 may be positioned by knob 29 to any angular position in the range 0° to 360° and accordingly at the receiving station or stations a radial trace or spot will appear on the tube 6 at the corresponding angular position. The spot or trace will be steady and the observer will know he is to read the compass or bearing scale.

When contacts 28A, 28B are moved to the next lower fixed contacts, the switches 30A, 30B and the interrupter switch 31 are included in circuit. The fixed contacts engageable by 28A, 28B are connected to taps of the slide-wires 11, 12 so that for each change position of control knob 30 of contacts 30A, 30B the output of the phase-shifter 4B is shifted in phase to extent corresponding with increase or decrease from one standard speed to another. The output of the phase-shifter is interrupted at suitable predetermined rate by the motor-drive cam switch 31 or equivalent with the result the trace or spot on the receiver indicator blinks rapidly or is broken informing the observer that the speed scale is to read.

When contacts 28A, 28B are moved to the next lower position, Figure 14, the banks 32A, 32B of contacts and the interrupter switch 33 are connected through cables 34A, 34B to taps from the slide-wires 11 and 12. Preferably the keys for operating the movable contacts of the banks 32A, 32B are arranged to simulate a typewriter keyboard, Figure 15. As each key is depressed a corresponding pair of movable contacts, one in each bank, complete connections to a pair of taps of slidewires 11, 12 to effect a shift in phase corresponding to a particular character. The phase-shifter output is keyed by interrupter switch 33 at rate different, for example lower, from rate of the "Speed" interrupter switch 31 so that the observer at the receiving station correlates the position of the slowly blinking spot or dash-type trace with the ring of characters and so can spell out or translate the various spot position to message form, in plain or coded language.

Coded messages may be sent from plain text messages by interposing a connection-changing plug and jack code-board between slide-wires 11, 12 and the banks 32A, 32B of the typewriter key-board. At the receiving station, the message may be decoded or may be directly read from the indicator 6A if the outer chart is replaced by one corresponding with the particular code-board in use at the transmitter.

Although for purpose of explanation, we have described various modifications of our invention it is not limited thereto but is coextensive in scope with the appended claims.

The invention described herein may be manufactured and used by or for the Government of the United States of America for governmental purposes without the payment of any royalties thereon or therefor.

What we claim is:

1. An electromagnetic wave communication system comprising at the transmitter a source of fixed frequency, means for shifting the phase of a portion of the output of said source in accordance with coded intelligence, means shaping said portion of said output into pulses of said frequency, means mixing said pulses and the remaining portion of said ouput and transmitting said mixed components as a complex wave, and at the receiver of said system a filter separating said components of said complex wave, multivibrator means responsive to said phase shifted pulse component of the wave for establishing a grid signal containing said coded intelligence, means including a cathode ray tube controlled by the components of the complex wave for decoding and visually presenting the intelligence, last said means including a phase-splitter in the output of said filter and deflecting means adapted to produce a circular cathode ray trace, last said means further including a resonant filtered electrical signal path from the multivibration means to a control grid of said tube for modulation of said trace according to said grid signal.

2. An electromagnetic wave communication system comprising at the transmitter, a source of fixed frequency, means for shifting the phase of a portion of the output of said source in accordance with coded intelligence, means shaping said portion of said output into pulses of said frequency, means mixing said pulses and the remaining portion of said output and transmitting said mixed components as a complex wave, and at the receiver of said system a filter separating said components of said complex wave, multivibrator means responsive to said phase shifted pulse component for establishing a grid signal containing said coded intelligence, means including a cathode ray tube controlled by the components of the complex wave for decoding and visually presenting the intelligence, last said means including a resonant filtered electrical signal path from the multivibrator means to a control grid of said tube for modulation of said trace according to said grid signal.

ADOLPH W. BORSUM.
WILHELM W. BROCKWAY.

(References on following page)

REFERENCES CITED

The following references are of record in the file of this patent:

UNITED STATES PATENTS

| Number | Name | Date |
|---|---|---|
| 2,110,746 | Tolson | Mar. 8, 1938 |
| 2,112,824 | Brown | Apr. 5, 1938 |
| 2,176,120 | Brown et al. | Oct. 17, 1939 |
| 2,233,275 | Wolff | Feb. 25, 1941 |
| 2,236,374 | Marrison | Mar. 25, 1941 |
| 2,256,487 | Moseley et al. | Sept. 23, 1941 |
| 2,321,971 | Becker | June 15, 1943 |
| 2,363,941 | Busignies | Nov. 28, 1944 |
| 2,402,973 | Moore | July 2, 1946 |
| 2,406,858 | Shepherd et al. | Sept. 3, 1946 |
| 2,407,336 | Young et al. | Sept. 10, 1946 |